United States Patent [19]
Quirk

[11] 3,963,185
[45] June 15, 1976

[54] FILAMENT WINDING METHOD

[75] Inventor: Robert W. Quirk, Los Angeles, Calif.

[73] Assignee: Hills-McCanna Company, Carpentersville, Ill.

[22] Filed: Feb. 11, 1974

[21] Appl. No.: 441,358

Related U.S. Application Data

[60] Division of Ser. No. 207,745, Dec. 14, 1971, abandoned, and a continuation-in-part of Ser. No. 108,321, Jan. 21, 1971, abandoned.

[52] U.S. Cl............................ 242/7.21; 156/172; 156/446; 215/315; 285/156
[51] Int. Cl............................................. B65H 81/08
[58] Field of Search .......... 156/170, 173, 172, 175, 156/169, 429, 430, 431, 432, 446; 285/156; 251/315; 242/7.1, 2, 3, 7.21, 7.22, 7.23

[56] References Cited
UNITED STATES PATENTS

| | | | |
|---|---|---|---|
| 3,112,234 | 11/1963 | Krupp.................................. | 242/2 X |
| 3,411,727 | 11/1968 | Uhlig et al. ............................. | 242/2 |
| 3,521,858 | 7/1970 | Albro.................................. | 251/315 |
| 3,701,489 | 10/1972 | Goldsworthy...................... | 242/7.21 |
| 3,765,979 | 10/1973 | Thomas ............................. | 156/173 |
| 3,773,583 | 11/1973 | Quirk.................................. | 156/175 |

FOREIGN PATENTS OR APPLICATIONS 1,000,375   8/1965   United Kingdom

Primary Examiner—Billy S. Taylor
Attorney, Agent, or Firm—Harris, Kern, Wallen & Tinsley

[57] ABSTRACT

A method and apparatus for winding fiber glass roving, tape rope, and/or the like, on a mandrel. The apparatus includes a turntable rotatable in either direction about a vertical axis and carrying means for winding the reinforcing material on the mandrel in response to rotation of the turntable, the mandrel being located on the turntable axis. The machine also includes means for shifting the axis of a shaft carrying the mandrel angularly relative to a vertical position wherein the mandrel shaft axis coincides with the turntable axis. The apparatus further includes means for rotating the mandrel shaft about its axis in either direction, when the mandrel shaft is in its vertical position, to assist the rotation of the turntable in winding the reinforcing material about the mandrel. With this construction, the reinforcing material may be wound on the mandrel in a variety of patterns.

Also disclosed are a method of making wound articles with the reinforcing material applied to a mandrel in various patterns, and various products made by the disclosed apparatus and in accordance with the disclosed method, including a T-shaped hollow article, such as a pipe fitting or a valve body, an elbow, a valve ball, and the like.

2 Claims, 21 Drawing Figures

INVENTOR.
ROBERT W. QUIRK

BY HIS ATTORNEYS

HARRIS, KIECH, RUSSELL & KERN

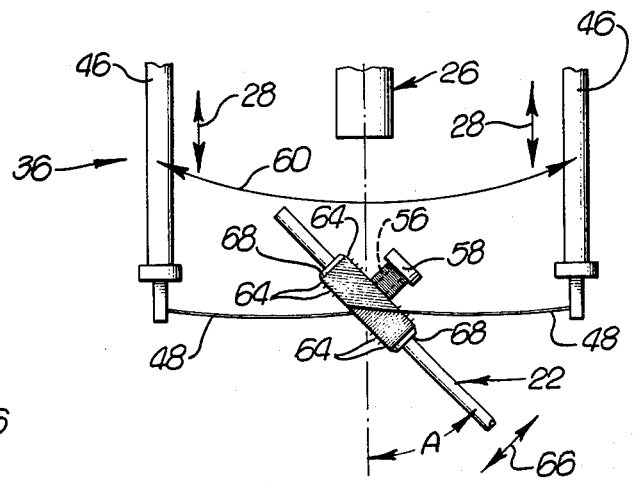
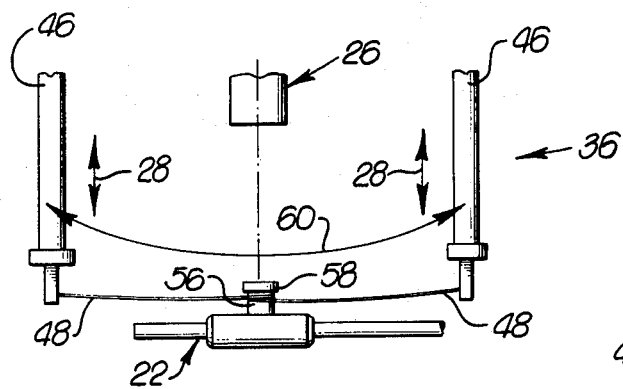
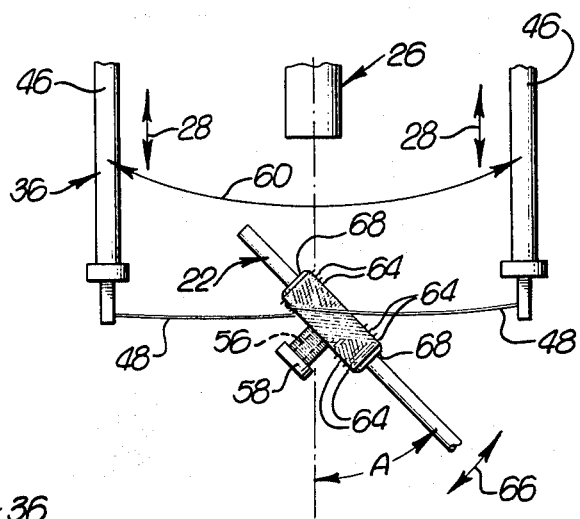
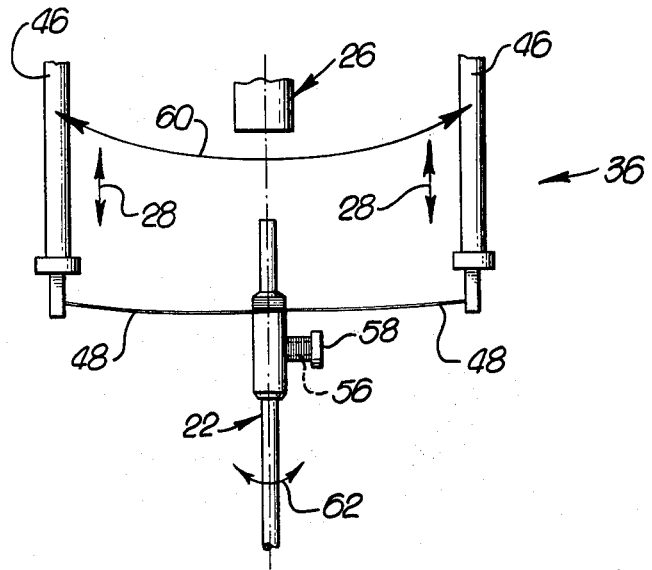
INVENTOR.
ROBERT W. QUIRK
BY HIS ATTORNEYS
HARRIS, KIECH, RUSSELL & KERN

INVENTOR.
ROBERT W. QUIRK
BY HIS ATTORNEYS.
HARRIS, KIECH, RUSSELL & KERN

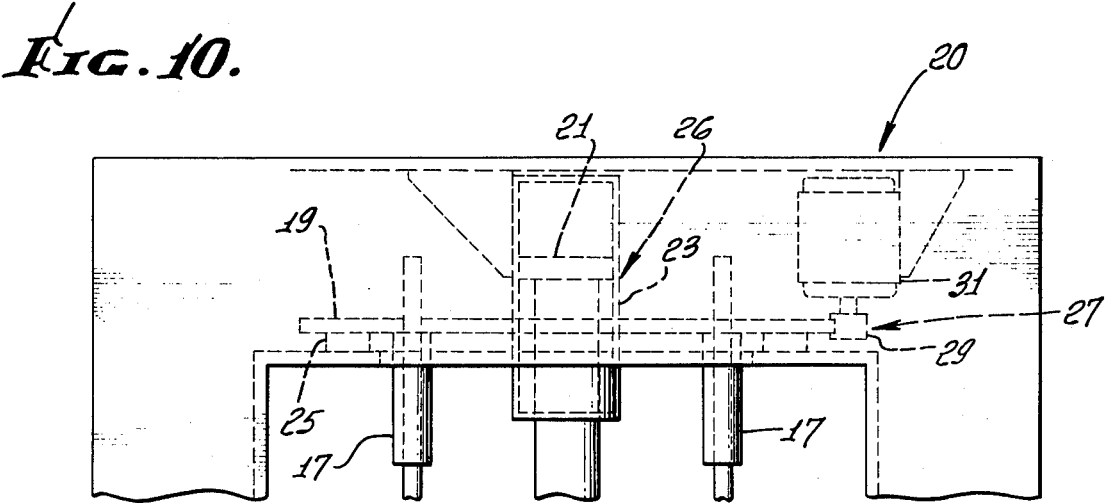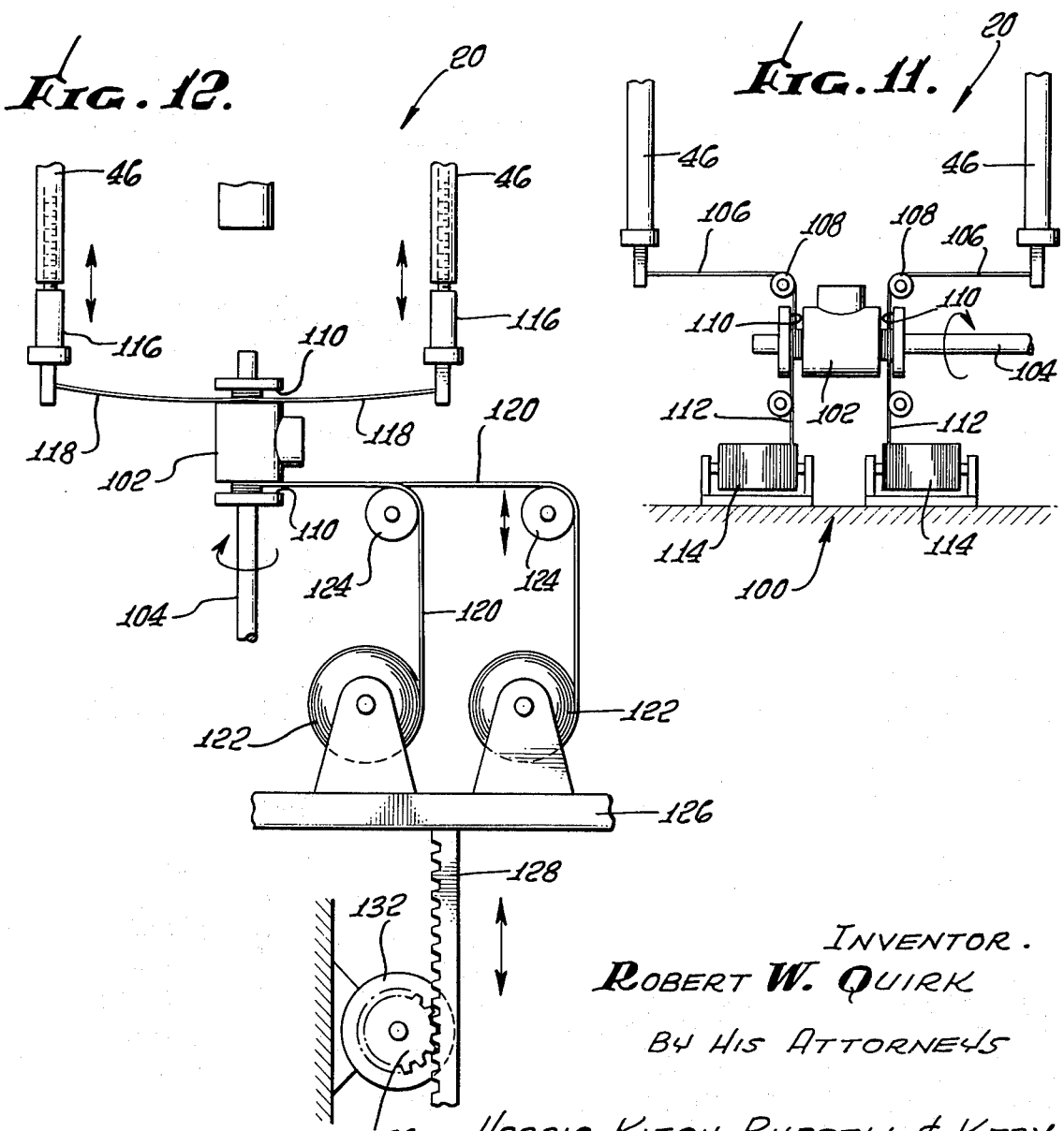

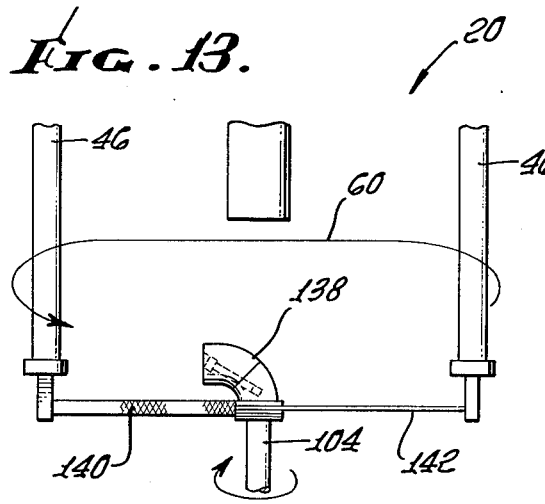
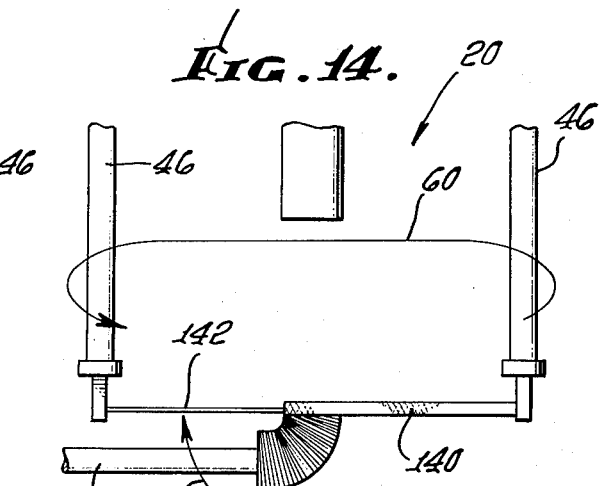
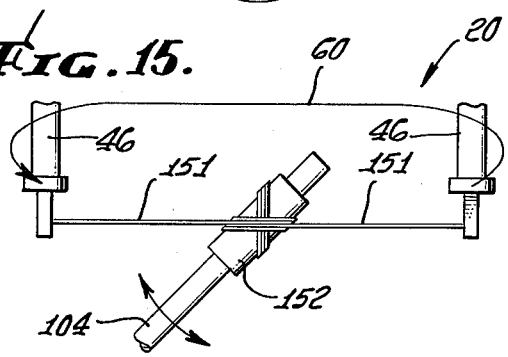
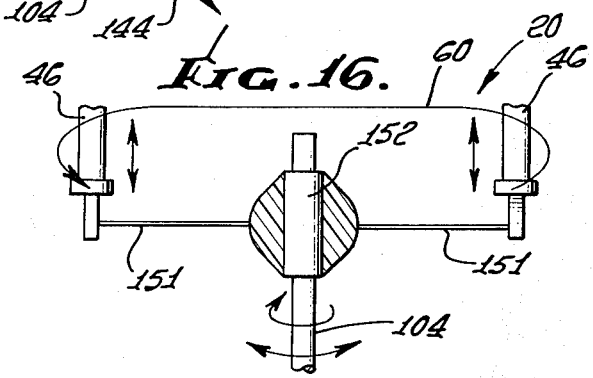
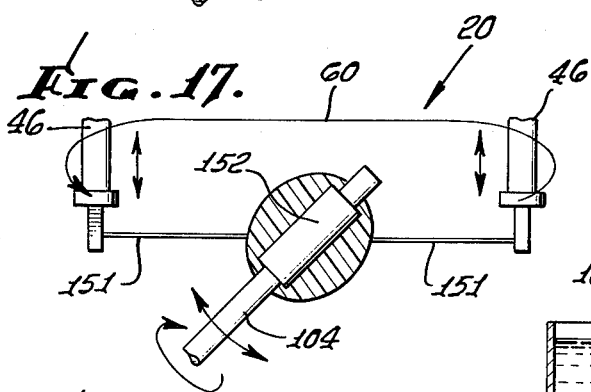
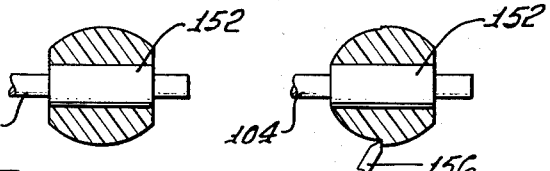
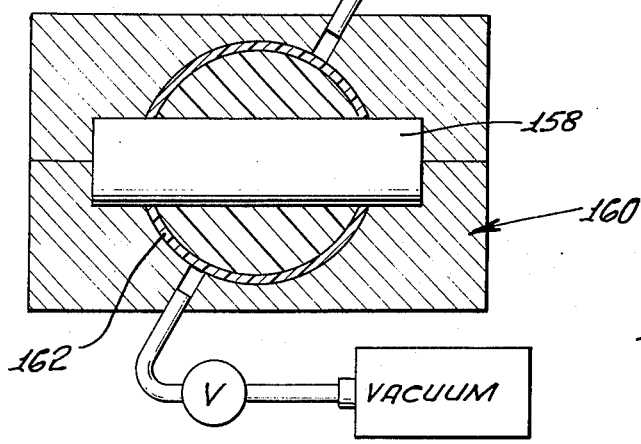
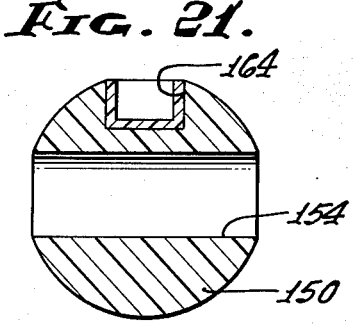

FILAMENT WINDING METHOD

CROSS REFERENCE TO RELATED APPLICATION

This application is a continuation-in-part of my copending patent application Ser. No. 108,321, filed Jan. 21, 1971, and now abandoned, and a division of Ser. No. 207,745, filed Dec. 14, 1971, and now abandoned.

BACKGROUND OF INVENTION

The present invention relates in general to the so-called filament winding art and, more particularly, to the art of reinforcing molded synthetic resin articles with windings of reinforcing material, such as fiber glass. Although the reinforcing material may actually comprise single filaments, it preferably comprises fiber glass roving and/or woven fiber glass tape and/or fiber glass rope and/or a combination of any or all of these with fiber glass mat and/or fabric.

More specifically, the present invention relates to a method and apparatus for making fiber reinforced articles by winding the reinforcing material, impregnated with a synthetic resin, on a mandrel in various patterns until the desired product configuration has been obtained.

SUMMARY AND OBJECTS OF INVENTION

With the foregoing background in mind, a primary object of the invention is to provide a method for winding fiber reinforcing material in a wide variety of patterns readily selectable by the operator of the machine.

More particularly, an important object of the invention is to provide a winding apparatus or machine which includes a turntable rotatable in either direction about a vertical axis and carrying means for winding fiber reinforcing material, impregnated with a synthetic resin, on a mandrel located on the axis of turntable rotation.

Another object is to provide a machine wherein the mandrel is carried by a shaft capable of being displaced angularly from a vertical position wherein the axis of the mandrel shaft coincides with the turntable axis.

Still another object is to provide a machine wherein the turntable is vertically movable so as to apply windings to different portions of the mandrel.

With the foregoing construction, a wide variety of winding patterns may be produced by varying the vertical position of the rotating turntable and by varying the angular position of the mandrel shaft, which is an important feature of the invention.

Another object is to provide an apparatus wherein the mandrel shaft is rotatable in either direction about its axis so that the mandrel can be rotated about the turntable axis when the mandrel shaft is in its vertical position. With this construction, the mandrel rotation assists the turntable rotation in applying the reinforcing material to the mandrel.

Yet another object is to provide a machine wherein the turntable is rotatable in either direction about the turntable axis, and wherein the mandrel is rotatable in either direction about the axis of the mandrel shaft, thereby rendering the machine more flexible in its operation.

A further object is to provide a valve ball of synthetic resin impregnated windings of fiber glass, or the like, the valve ball being machined to a true spherical configuration after winding and curing.

The foregoing objects, advantages, features and results of the present invention, together with various other objects, advantages, features and results thereof which will be evident to those skilled in the so-called filament winding art in the light of this disclosure, may be achieved with the exemplary embodiments of the article, apparatus and method of the invention illustrated in the accompanying drawings and described in detail hereinafter.

DESCRIPTION OF THE DRAWINGS

In the drawings:

FIGS. 3, 4, 5 and 6 illustrate successive steps in the winding of a T-shaped mandrel in accordance with the method of the invention, utilizing the apparatus of FIG. 2, to form the fiber reinforced, molded, T-shaped hollow article of FIG. 1;

FIG. 10 is a fragmentary view illustrating in more detail the top of the machine of FIG. 2;

FIGS. 11 and 12 are views respectively illustrating attachments to the machine for applying to a mandrel additional reinforcing material when the mandrel is in the respective positions of FIGS. 3 and 4 of the drawings;

FIGS. 13 and 14 illustrate successive steps in the winding of an elbow with the machine of the invention;

FIGS. 15 and 17 illustrate successive steps in the winding of a valve ball with the apparatus of the invention;

FIG. 18 is a sectional view of the valve ball after winding;

FIG. 19 is a view illustrating machining of the valve ball into a spherical configuration;

FIG. 20 is a view illustrating a molding operation performed on the machined valve ball; and FIG. 21 is a sectional view of the finished valve ball.

DETAILED DESCRIPTION OF THE EXEMPLARY EMBODIMENTS OF INVENTION

Figure 1:
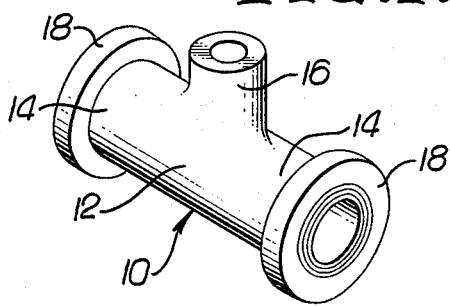
FIG. 1 is a perspective view of a fiber reinforced, molded, T-shaped hollow article formed by the apparatus of the invention.

Referring initially to FIG. 1 of the drawings illustrated therein is a fiber reinforced, molded synthetic resin, T-shaped hollow article 10 of the invention comprising a body 12 having longitudinally spaced end portions 14 and a laterally extending neck portion 16.

Figure 7:
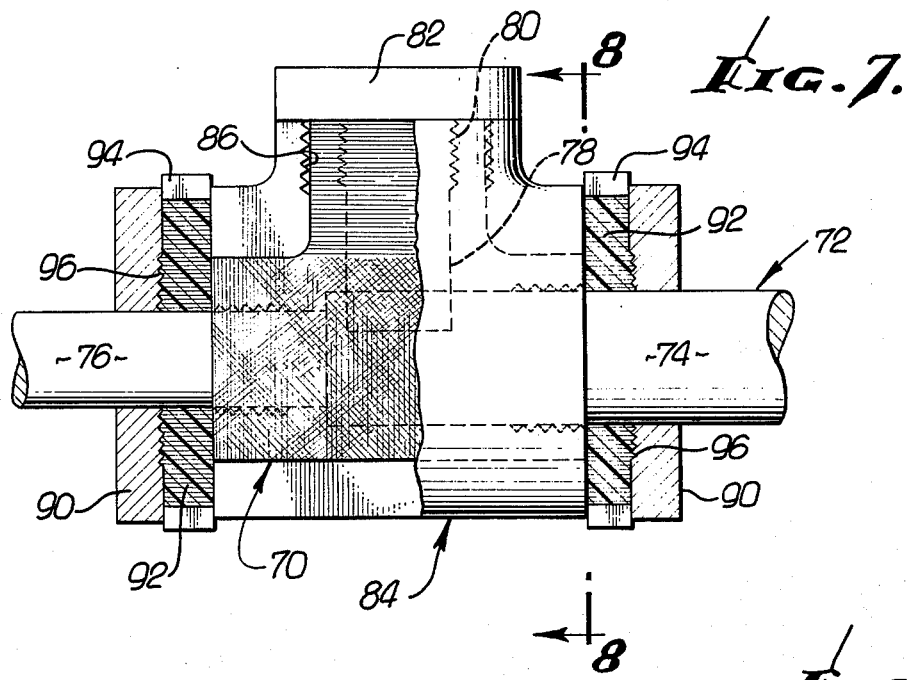
FIG. 7 is a longitudinal sectional view illustrating additional winding steps to be performed in connection with an alternative T-shaped hollow article of the invention, and also illustrating a molding operation of the invention, and an alternative T-shaped mandrel.

The body 12, end portions 14 and neck portion 16 are made in accordance with the apparatus and method illustrated in FIGS. 2 to 6, followed by a molding operation similar to that shown in FIG. 7. The article 10 is also shown as provided at the extremities of the end portions 14 with annular flanges 18 made as suggested in FIG. 7 of the drawings. It will be understood that the flanges 18 may be used to couple the article 10 to similarly flanged pipe sections, not shown.

Figure 2:
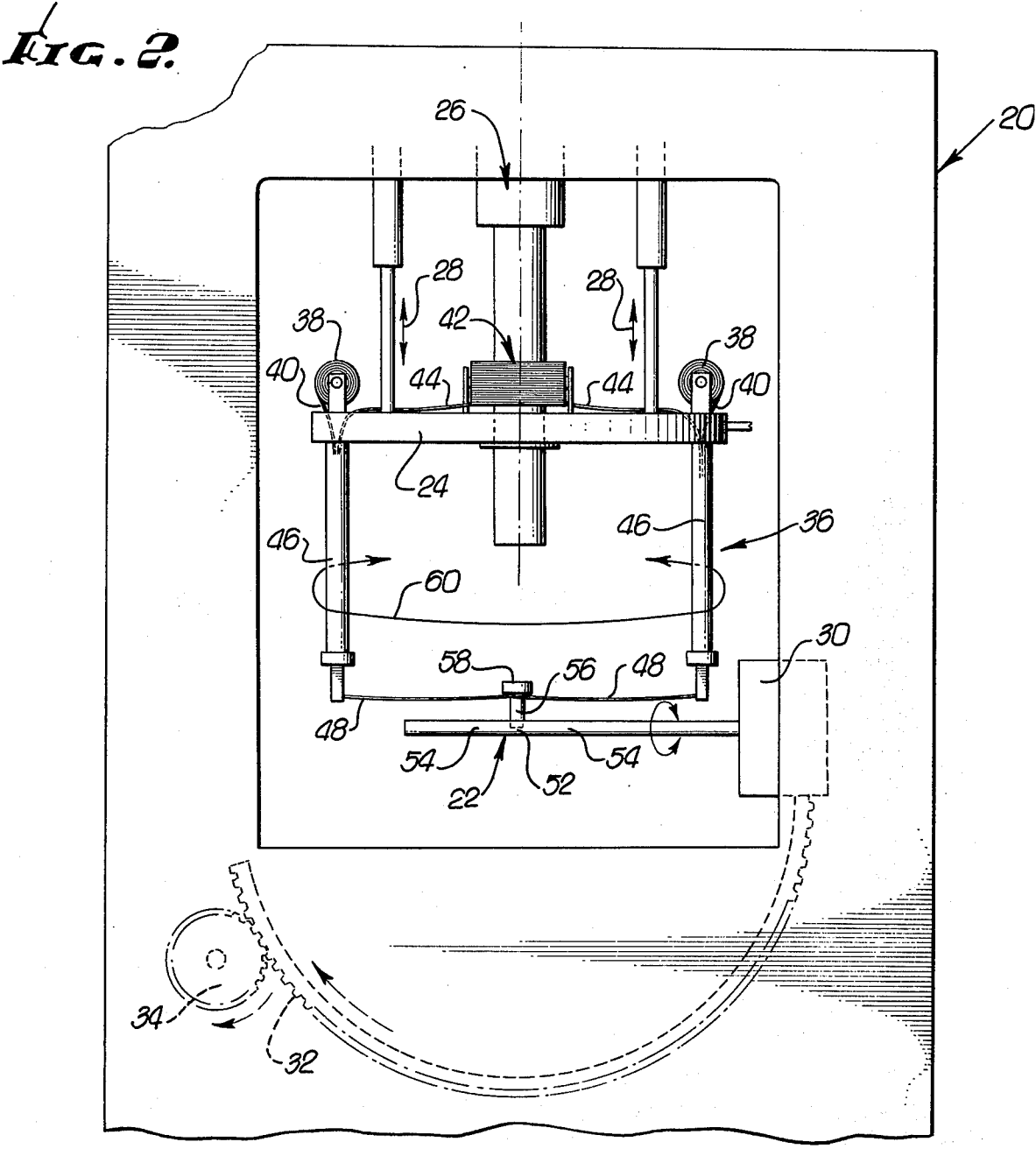
FIG. 2 is a front elevation of an apparatus or machine of the invention for winding a mandrel with a reinforcing material in accordance with the invention.

Turning now to FIGS. 2 and 10 of the drawings, illustrated therein is a winding apparatus or machine 20 of the invention for winding synthetic resin impregnated reinforcing material on a T-shaped mandrel 22 on a mandrel supporting shaft, in making the T-shaped hollow article 10. The winding machine 20 includes a turntable 24 which is rotatable about a vertical axis, the machine including means 26 for moving the turntable upwardly and downwardly away from and toward the mandrel 22, as indicated by the arrows 28. Suitable means 27 is provided for rotating the turntable 24 about its axis.

More particularly, the turntable 24 may be carried by and moved upwardly and downwardly by a piston 21 in a cylinder 23 on the frame of the machine 20. Telescoping vertical struts 17 interconnect the turntable 24 and a rotor 19 carried on an annular bearing 25 on the frame of the machine. The rotor 19 comprises a peripheral gear meshed with a drive gear 29 driven by a reversible motor 31.

The mandrel 22 is positioned below the turntable 24 and is mounted on a mandrel supporting shaft carried by means 30 for rotating the mandrel shaft about its longitudinal axis. The rotating means 30 is carried by a sector gear 32 which is driven by a gear 34 to change the angular relationship between the longitudinal axis of the mandrel and the turntable axis, as shown in FIGS. 3 to 6 of the drawings and as described in detail hereinafter.

The turntable 24 carries means 36 responsive to rotation of the turntable for winding reinforcing material around various portions of the mandrel 22 selectively, as will be discussed in more detail hereinafter. The winding means comprises supply reels 38 carried by the turntable 24 and carrying fiber glass roving 40. The turntable 24 also carries means 42 for impregnating two tapes 44 of woven fiber glass with a suitable synthetic resin. One or more of the rovings 40 and one of the tapes 44 are fed downwardly through a depending guide 46, the other roving and tape being fed downwardly through a diametrally opposite, depending guide 46. From the lower ends of the guides 46, the rovings 40 and tapes 44 extend to and are connected to the mandrel 22 as reinforcing strands 48. It will be understood that although the reinforcing strands 48 have been disclosed as made up of the rovings 40 and tapes 44 of fiber glass, various other reinforcing elements may be used, such as fiber glass rope, or reinforcing elements of other materials.

Continuing to refer to FIG. 2 of the drawings, the part of the mandrel 22 on which the strands 48 are wound in making the article 10 includes a body 52 corresponding to the body 12 of the article. The body portion 52 has longitudinally spaced end portions 54, corresponding to the end portions 14 of the article 10, and spaced apart along the longitudinal axis of the mandrel 22. The mandrel 22 also includes a neck portion 56 corresponding to the neck portion 16 of the article 10 and suitably removably secured to the body portion 52 of the mandrel. In the particular construction illustrated, the neck portion 56 of the mandrel 22 terminates in an annular flange 58 which serves as a stop for the strands 48 as they are wound.

Considering the winding operations performed by the machine 20, winding of the strands 48 around the neck portion 56 of the mandrel will be considered first for convenience. As shown in FIGS. 2 and 3, the mandrel 22 is so positioned that the lateral axis of the neck portion 56 coincides with the axis of the turntable 24. The ends of the two strands 48 of reinforcing material are connected to the neck portion 56 of the mandrel 22, as by winding a few turns around the neck portion manually. Then, the turntable 24 is rotated about its axis in either direction, as indicated by the arrows 60, and the turntable is simultaneously moved upwardly and downwardly, as indicated by arrows 28, until several layers of helical, substantially circumferential, windings are built up on the neck portion 56 of the mandrel.

Next, as shown in FIG. 4, the mandrel 22 is swung into a postion such that its longitudinal axis is vertical and coincides with the turntable axis. Then, the ends of the strands 48 are suitably connected to one end portion 54 of the mandrel and several layers of substantially circumferential, helical windings are applied to such end portion, by rotating the turntable 24, as indicated by the arrows 60, and, if desired, by also rotating the mandrel 22 in either direction, as indicated by the arrow 62 in FIG. 4. It will be understood that the turntable 24 is moved upwardly and downwardly, as indicated by the arrows 28, during this process to form helical windings. When the first end portion 54 has been wound to the desired thickness with the resin impregnated strands 48, the process is repeated with the other end portion.

Next, as shown in FIGS. 5 and 6 of the drawings, the mandrel 22 is positioned with its longitudinal axis at an acute angle A to the axis of the turntable 24, first with the neck portion 56 facing in one direction, as shown in FIG. 5, and then with the neck portion 56 facing in the opposite direction, as shown in FIG. 6. In each of these positions of the mandrel 22, the ends of the reinforcing strands 48 are attached to the previous windings and the turntable 24 is simultaneously rotated and moved upwardly and downwardly. This procedure forms helical windings across the end portions 54 and the body portion 52 of the mandrel 22, first on one side of the neck portion 56, as angle windings from slipping, they may be anchored by longitudinally spaced pins 64 inserted into previous circumferential windings formed on the end portions 54, as hereinbefore discussed in connection with FIG. 4. Ultimately, these pins are completely covered with windings of the reinforcing material.

A further winding technique is to wind the Tee body while supported in the angular position A by rotating the mandrel in a continuous manner in one direction and the arms 46 in the opposite direction. A cross hatch helical winding pattern is established when properly synchronizing the opposed rotary speeds of the mandrel and arms.

If desired, the angle of the longitudinal axis of the mandrel 22 relative to the axis of the turntable 24 may be changed during the angle winding operations, as indicated by the arrows 66 in FIGS. 5 and 6. To insure application of the angle windings to the mandrel 22, and to underlying windings, at the base of the neck portion of the article being wound, the angle wound strands may extend over the end faces 68 formed by previous circumferential windings on the end portions 54. Also, the angle windings may extend radially outwardly over previous circumferential windings on the neck portion 56, thereby insuring the presence of angle windings at the base of the neck portion of the wound article.

After a few layers of angle windings have been applied, additional substantially circumferential helical windings may be applied to the neck portion 56, and then to the end portions 54, whereupon additional angle windings are applied. This sequence of steps is repeated until the desired thickness of wound reinforcing material is achieved.

When the desired thickness of circumferential neck and end windings and acute-angle end and body windings has been achieved, substantially circumferential, helical windings are applied, substantially circumferential, helical windings are applied at the extremities of the end portions 14 to form the flanges 18, and the resulting wound article is cured in a mold (or, if desired, in its "as wound" condition). This will be discussed hereinafter in connection with FIGS. 7 and 8 of the drawings, which show an article 70 similar to the article 10 formed on a mandrel 72 similar to the mandrel 22.

Figure 8:
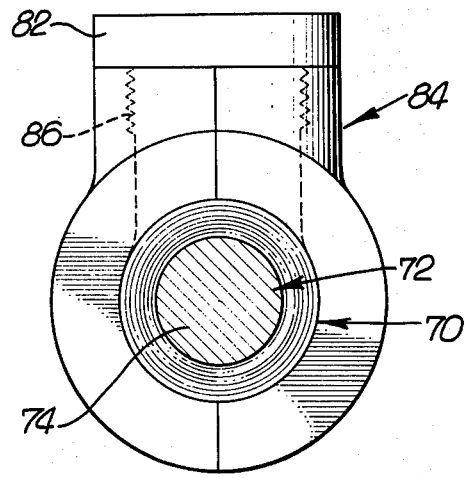
FIG. 8 is a transverse sectional view taken as indicated by the arrowed line 8–8 of FIG. 7.

Referring to FIGS. 7 and 8, the mandrel 72 differs from the mandrel 22 in that it has portions 74 and 76 of major and minor diameters. The neck portion of the mandrel 72 is designated by the numeral 78 and is externally threaded at 80 to provide the neck portion of the article 70 with internal threads. (The mandrel portions 74 and 76 may also be externally threaded, as shown in FIG. 7, to provide the article 70 with internally threaded ports. In this event, the flanges 92 described hereinafter are omitted.) The neck portion 78 of the mandrel 72 terminates in an annular, winding limiting flange 82 corresponding to the flange 58 of the mandrel 22.

Figure 9:
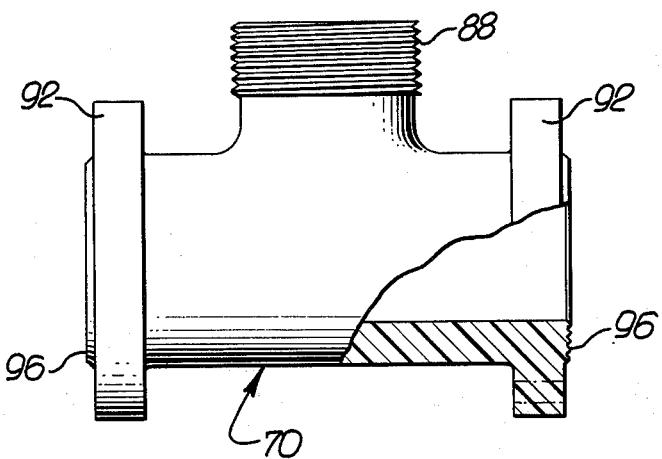
FIG. 9 is a side elevational view, partially in longitudinal section, illustrating the aforementioned alternative product of the invention.

After the neck, end and body portions of the article 70 have been wound on the mandrel 72 in the manner hereinbefore described and illustrated in connection with the mandrel 22, the resulting wound, resin impregnated body is placed in a split mold 84 which interfits with the flange 82 on the neck portion 78 of the mandrel 72 in the manner shown in FIGS. 7 and 8, the two halves of the mold 84 being secured together in any suitable manner. The interior of the neck portion of the mold 84 is internally threaded, as indicated at 86, to form external threads 88, FIG. 9, on the neck portion of the finished article 70.

After the mold 84 has been applied to the wound body of the article 70, discs 90 are suitably secured to the mandrel 72 at points spaced from the extremities of end portions of the wound body. Thereafter, substantially circumferential, helical, resin impregnated windings of reinforcing material are built up between the discs 90 and the ends of the split mold 84 to form flanges 92. As will be understood, this can be accomplished by positioning the mandrel 72 as shown in FIG. 4 of the drawings, and then winding a few turns of the strands 48 around the mandrel 72 in the space between one of the discs 90 and the corresponding mold end. Thereafter, the turntable 24 and/or the mandrel 72 is rotated until the corresponding flange 92 is built up to the desired diameter. Thereafter, the same procedure is followed to build up the other flange 92.

It will be understood that the flanges 18 of the article 10 of FIG. 1 may be formed in the same way. Also, if desired, a similar flange, not shown, may be formed on the outer end of the neck portion 16 of the article 10, or the neck portion of the article 70 in lieu of the threads previously discussed.

Reverting to FIG. 7, after the flanges 92 have been formed, annular mold rings 94 are applied around the flanges. These may be split rings suitably secured together. At this point, the entire article 70, including its flanges 92, are completely encased within a mold system comprising the mold 84, the discs 90, the flange 82 and the mold rings 94. The next step is to cure the resin impregnating the windings forming the article 70 and its flanges 92, whereupon the mold system is disassembled and the portions of the mandrel 72 removed. The end result is the fiber reinforced molded synthetic resin article 70 illustrated in FIG. 9 of the drawings. Preferably, the inner faces of the end discs 90 are provided with annular ribs 96 of V-shaped or U-shaped cross section to provide the end faces of the finished article 70 with corresponding annular ribs for the purposes of fluid-tight seals with abutting pipe sections, or the like, not shown.

The articles 10 and 70 formed in accordance with the invention, as hereinbefore described, have extremely high strengths which are substantially uniform in all directions due to the particular winding patterns hereinbefore discussed. In practice, it has been found that strengths approaching or exceeding those of comparable steel articles can be attained readily.

Turning now to FIG. 11 of the drawings, illustrated therein is an attachment 100 to the machine 20 which facilitates winding annular flanges at the ends of a wound body 102 similar to the wound body of the article 70. The wound body 102 is formed on a mandrel similar to those described previously, the mandrel being carried by a mandrel shaft 104. The latter is positioned horizontally with the axis of the turntable 24 of the machine 20 intersecting the wound body 102.

Resin impregnated reinforcing elements 106 are fed from the guides 46 over pulleys 108 and into annular spaces 110 in which the annular flanges at the ends of the wound body are to be formed. Additional reinforcing elements 112 are fed into the spaces from spools 114. Preferably, suitable means, not shown, for impregnating the elements 112 are also provided. The reinforcing elements 106 and 112 are preferably any of the fiber glass reinforcing elements hereinbefore discussed, or combinations thereof. As will be apparent, by rotating the mandrel shaft 104 about its axis, both the reinforcing elements 106 and the reinforcing elements 112 are simultaneously wound on the mandrel in the annular spaces 110 to build up annular flanges at the ends of the wound body 102. This arrangement materially reduces the time required to build up such annular flanges.

In FIG. 12 is shown another embodiment wherein the guides 46 have lower portions 116 threadedly connected to the upper portions thereof. With this construction, the lower ends 116 of the guides 46 may be positioned at different levels in a manner which is not shown, but which will be apparent. By doing this, reinforcing elements 118 from the two guides can be wound in the annular spaces 110 at the ends of the wound body 102 simultaneously, the mandrel shaft 104 in this instance being positioned vertically. By rotating both the turntable 24 and the mandrel shaft 104, two annular flanges can be wound rapidly.

With the particular arrangement shown in FIG. 12, both reinforcing elements 118 from the guides 46 are being wound in one of the annular spaces 110 by rotation of the mandrel shaft 104. At the same time, reinforcing elements 120 are being wound in the other annular space 110 from spools 122, the elements 120 being trained over pulleys 124. When winding flanges at both ends of the wound body 102 in this fashion, preferably only the mandrel shaft 104 is rotated, the turntable 24 being stationary. It will also be understood that suitable means, not shown, are provided for impregnating the reinforcing elements 120 with the desired synthetic resin.

To enable the spools 122 to be used to wind an annular flange in either annular space 110, the spools 122 and the pulleys 124 are mounted on a carriage 126 supported by a rack 128 driven by a gear 130 which, in turn, is driven by a motor 132. Another alternative arrangement is to so mount one of the pulleys 124 that its position can be adjusted vertically, whereby one of the reinforcing elements 120 may be fed to one of the annular spaces 110 and the other reinforcing element to the other annular space. Thus, the arrangement of FIG. 12 is very flexible insofar as winding annular flanges at the ends of the body 102 is concerned.

FIGS. 13 and 14 illustrate how the machine 20 of the invention can be utilized to form a wound elbow. In this case, the mandrel shaft 104 carries an elbow-shaped mandrel 138 on which reinforcing elements 140 and 142 are wound. These elements, which are impregnated with the desired synthetic resin in the manner hereinbefore described, may be any of the fiber glass elements hereinbefore discussed. In the particular arrangement illustrated, the reinforcing element 140 is a woven fiber glass tape while the element 142 may be a fiber glass filament, roving, rope, or the like.

As shown in FIG. 13, one end of the mandrel 138 may be wound with the mandrel shaft 104 in a vertical position, by rotating both the turntable 24 and the mandrel shaft. The intermediate portions of the mandrel 138 and the other end thereof are wound by rotating the turntable 24 only, as indicated by the arrow 60, while rocking the mandrel shaft 104 back and forth between a vertical position, as shown in FIG. 13, and a horizontal position, as shown in FIG. 14, such rocking or angular shifting of the mandrel shaft being designated by the double headed arrow 144.

Turning now to FIGS. 15 to 21, the machine 20 of the invention may also be utilized to make a filament wound synthetic resin valve ball 150, FIG. 21. Such a valve ball represents an important feature since it can be made, in accordance with the invention, at a cost much less than that of a comparable stainless steel ball, and yet has all of the attributes of stainless steel insofar as resistance to corrosive fluids, and the like, are concerned.

The valve ball 150 is formed by winding reinforcing elements 151 on a cylindrical mandrel 152 which forms a diametral passage 154 through the completed ball. The reinforcing elements 151 may be any of those described previously.

Initially, as shown in FIG. 15, the mandrel shaft 104 is rocked back and forth while the turntable 24 is rotated, as indicated by the arrow 60, to wrap the reinforcing elements 151 around the central portion of the mandrel 152 at varying acute angles.

Next, as shown in FIG. 16, the mandrel axis is positioned in coincidence with the turntable axis, and the central portion of the ultimate ball is built up by winding the reinforcing elements 151 circumferentially on the previous windings. This may be accomplished by rotating the turntable 24 and/or the mandrel 104, at the same time moving the guides 46 up and down to distribute the windings over the central portion of the article. Subsequently, the mandrel is returned approximately to the position of FIG. 15, as shown in FIG. 17, and is rocked back and forth while additional windings are applied. In this case a full overlap wind is applied which extends over the ends of the mandrel 152, as shown.

Turning to FIG. 18, the ends of the wound body are then cut off, with any suitable tool, flush with the ends of the mandrel 152. Next, as shown in FIG. 19, the wound body is machined into a spherical configuration with a suitable cutting tool 156.

Next, the machined wound body is placed on an arbor 158 in a jacket mold, not shown, and an outer skin, not shown, is applied and cured. This outer skin covers any cut ends of the reinforcing material exposed by the machining operation. Finally, as shown in FIG. 20, the arbor 158, carrying the machined wound body with the outer skin thereon, is placed in a vacuum filled mold 160 and a special outer coating 162 is applied, such outer coating being one having lubrication properties and low friction properties. For example, it may include Teflon and molybdenum disulfide.

One other operation which is performed to complete the valve ball 150 is to form therein a socket 164 for an actuating stem, not shown. Preferably, the socket 164 is provided with a metallic liner 166.

Altough exemplary embodiments of the invention have been disclosed herein for purposes of illustration, it will be understood that various changes, modifications and substitutions may be incorporated in such embodiments without departing from the spirit of the invention as defined by the claims appearing hereinafter.

I claim as my invention:

1. A method of winding reinforcing material on a T-shaped mandrel which includes a body having longitudinally spaced end portions providing a longitudinal axis and having a laterally extending neck portion, including the steps of:
    a. winding reinforcing material substantially circumferentially around said neck portion;
    b. winding reinforcing material substantially circumferentially around each of said end portions while continuously rotating said body through a plurality of revolutions about said longitudinal axis;
    c. winding reinforcing material around said body and said end portions at an acute angle to said longitudinal axis and on both sides of said neck portion;
    d. changing the orientation of said longitudinal axis while performing the step of subparagraph (c) above so as to vary said acute angle of said reinforcing material to said longitudinal axis;
    e. repeating the foregoing steps until the desired thickness has been achieved; and
    f. forming annular flanges at the extremities of said end portions of said mandrel by substantially circumferentially winding reinforcing material on said mandrel.

2. A method as set forth in claim 1 including the additional step of also continuously rotating said body through a plurality of revolutions about said longitudinal axis while performing the steps of subparagraphs (c) and (d) of claim 1.

* * * * *